United States Patent [19]

Sakamoto et al.

[11] Patent Number: 5,033,672
[45] Date of Patent: Jul. 23, 1991

[54] AUTOMOBILE AIR CONDITIONING SYSTEM

[75] Inventors: Hiroaki Sakamoto, Fukuyama; Hiroyuki Sumihara, Hiroshima; Shigetoshi Doi, Iwakuni; Shinshi Kajimoto, Hiroshima, all of Japan

[73] Assignee: Mazda Motor Corporation, Hiroshima, Japan

[21] Appl. No.: 535,195

[22] Filed: Jun. 8, 1990

[30] Foreign Application Priority Data

Jun. 9, 1989 [JP] Japan ................................ 1-67952[U]

[51] Int. Cl.$^5$ .............................................. B01F 3/02
[52] U.S. Cl. .................................... 236/44 A; 62/133; 98/2.09
[58] Field of Search ................ 62/133; 98/2.01, 2.09; 236/44 R, 44 A

[56] References Cited

U.S. PATENT DOCUMENTS 4,424,933 1/1984 Sutoh et al. ...................... 236/44 A
4,852,363 8/1989 Kampf et al. ..................... 236/44 A Primary Examiner—William E. Wayner
Attorney, Agent, or Firm—Fleit, Jacobson, Cohn, Price, Holman & Stern

[57] ABSTRACT

An automobile air conditioning device includes a ventilation system with a ventilation fan for discharging air contained in a passenger chamber from the vehicle. A dew condensation detector is adapted to detect a predetermined relative humidity for a dew point at which dew condensation on a rear window glass of the vehicle is presumed to occur. A controller actuates the ventilation system when the dew condensation detector detects the dew point while the vehicle is running.

11 Claims, 4 Drawing Sheets

AUTOMOBILE AIR CONDITIONING SYSTEM

FIELD OF THE INVENTION

The present invention relates to an automotive air conditioning device and, more particularly, to an air conditioning device with a system for ventilating a chamber of an automotive vehicle.

BACKGROUND OF THE INVENTION

Vehicle window glasses, and in particular, glasses in rear windows of vehicles, tend to collect moisture or cloud up with condensed dew. This is because the humidity often becomes higher in the interior of an automotive vehicle than on the exterior of the vehicle. In recent years, a ventilation system has been proposed which ventilates the interior of an automotive vehicle while the automotive vehicle is parked. The ventilation system includes a ventilation fan actuated by a solar cell when the interior of the automotive vehicle reaches a preselected temperature. Such a ventilation system is known from, for example, Japanese Patent Publication No. 59-51451.

However, since the ventilation fan of this known ventilation system is actuated according to the temperature of the interior of the automotive vehicle only when the automotive vehicle is parked and the engine of the automotive vehicle is stopped, it is impossible to actuate the ventilation fan so that the rear window glass is cleared if it is clouded with condensed dew while the automotive vehicle is traveling.

SUMMARY OF THE INVENTION

It is accordingly a primary object of the present invention to provide a novel automobile air conditioning device which can quickly demist a rear window glass.

An automobile air conditioning device according to the present invention has a ventilation system with a ventilation fan for discharging air contained within a passenger chamber of a vehicle out of the vehicle. The air conditioning device includes dew condensation detecting means adapted to detect dew condensation on a rear window glass of the vehicle and control means for actuating the ventilation system when the dew condensation detecting means detects dew condensation while the vehicle is running.

The dew condensation detecting means detects the humidity around the rear window glass and determines whether the humidity is above a dew point at which a dew condensation is assumed to occur.

The ventilation system includes ventilation duct means, which communicates the passenger chamber to the atmosphere outside of the vehicle. The ventilation duct means has an intake duct with one end opening inside the passenger chamber below the window glass and its other end opening inside a trunk volume or room of the vehicle, and an exhaust duct with one end connected to the ventilation fan, which is disposed in the trunk room, and its other end opening to the atmosphere outside the vehicle.

BRIEF DESCRIPTION OF THE DRAWINGS

The above and other objects and features of the present invention will be apparent from the following description of a preferred embodiment thereof when considered in conjunction with the appended drawings, in which.

DETAILED DESCRIPTION OF THE PREFERRED EMBODIMENT

Figure 1:
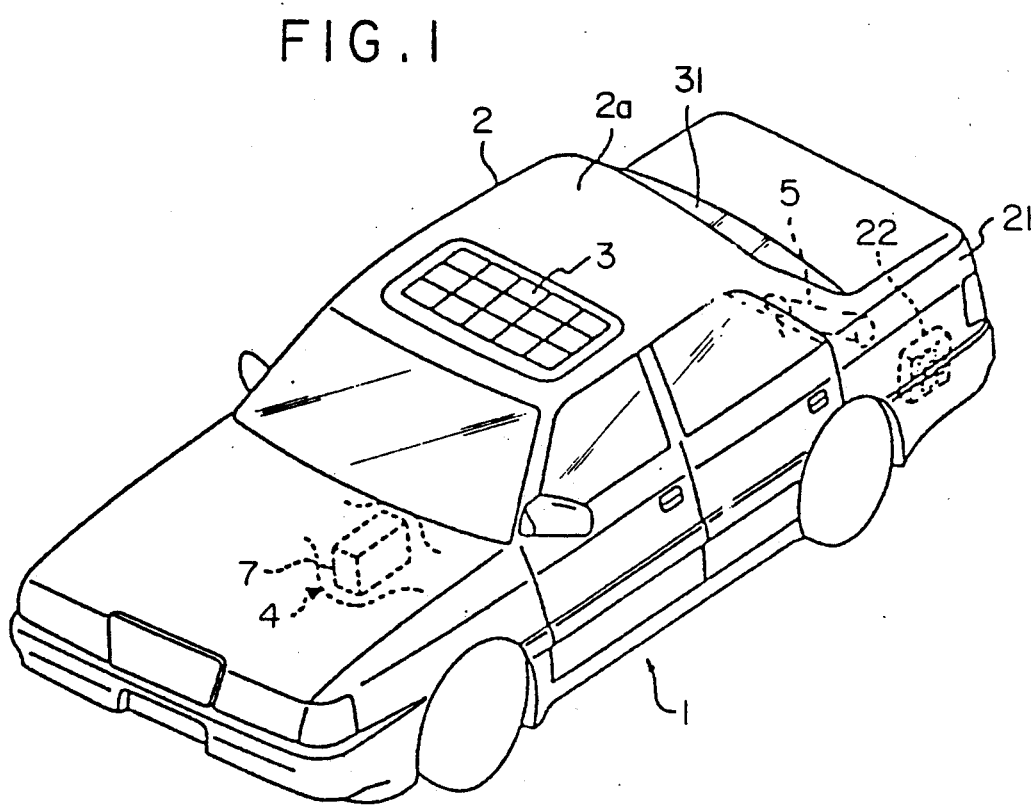
FIG. 1 is a schematic perspective view of an automotive vehicle in which an air conditioning device in accordance with a preferred embodiment of the present invention is incorporated.

Referring to FIG. 1, the present invention is embodied in an automobile air conditioning device incorporated in an automotive vehicle 1. Car body 2 of the automotive vehicle 1 is provided with a panel of solar cells 3 disposed on front part of a roof 2a thereof. The solar cells 3 used as the primary power supply for an electric motor operated ventilation fan 22 described in detail later, absorb sunlight, converting the radiation to electric power. The ventilation fan 22 is located inside a rear fender panel 21 of the car body 2. In a front section of the car body 2, an automobile air conditioning unit 4 is disposed.

Figure 2:
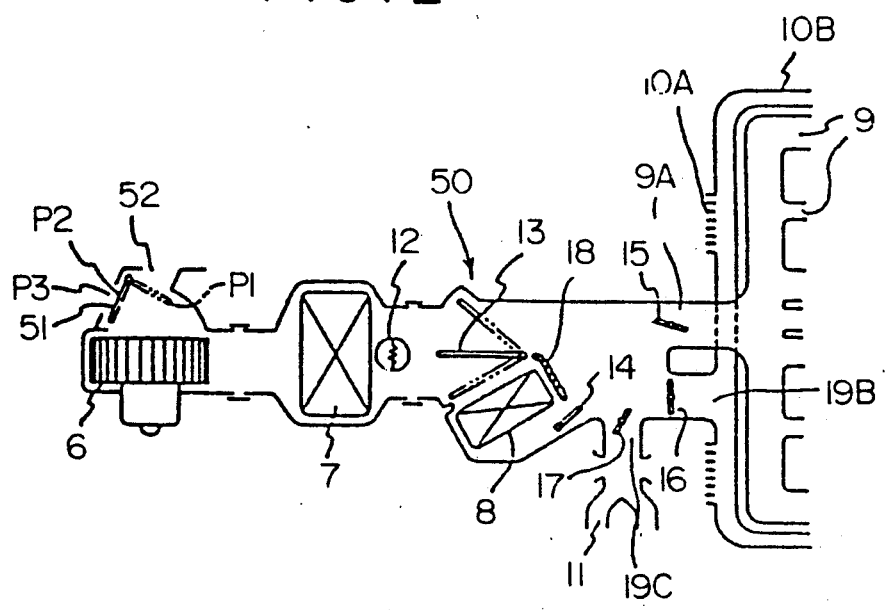
FIG. 2 is a schematic illustration showing an air conditioning unit of the air conditioning device.

As is shown in detail in FIG. 2, the automobile air conditioning unit 4 has a main air distributor duct 50 provided with an ambient air intake 52 and a recirculated air intake 53 adjacent to each other. Between the air intakes 52 and 53, there is a motor controlled air intake door 51 changeable in position between an ambient air intake position P1 and a recirculated air intake position P2 so as selectively to open and close the air intakes 52 and 53. All incoming air, circulated or ambient, is forced to flow into the air distributor duct 50 by an electric motor driven blower 6. To cool the air, it is passed first through an evaporator core 7, well known in operation and fabrication in the art, disposed downstream of the blower 6 in the distributor duct 50.

Provided after the evaporator core 7 in the main air distributor duct 50 are electric motor controlled air mixing or control doors 13 and 14 on both sides of a stationary buffer 18. A heater core 8, well known in operation and fabrication in the art, is disposed adjacent to the buffer 18. Into the heater core 8, heated engine coolant water is conducted in order to heat air passing through the heater core 8. The air mixing doors 13 and 14 are controlled to open or close so as to regulate the flowing amount of air reaching the heat core 8. As is well known in the art, by controlling the evaporator and heater cores 7 and 8, and the air mixing doors 13 and 14, heated air is blended with unheated air to produce a desired outlet air temperature.

At the downstream end of the main air distributor duct 50, there are a vent air duct 19A, a defroster air duct 19B and a heated air duct 19C all in communication with the main air distributor duct 50. The vent air duct 19A has vent air outlets 9, all opening inside the vehicle. The defroster air duct 19B has main defroster air outlets 10A with louvers and side defroster outlets 10B, all opening inside the vehicle, and the heated air duct 19C has a plurality of, for instance four, heat air outlets 11, all opening inside the vehicle. Disposed at junctions between the air distributor duct 50 and the respective air ducts 19A, 19B and 19C are control dampers or doors 15, 16 and 17, respectively. These control doors 15, 16 and 17 are controlled, either manually or automatically, to open and close so as to selectively provide required airflow modes, such as a vent airflow mode, a bi-level airflow mode, a heated airflow mode, a defroster-and-heated airflow mode and a defroster airflow mode. As an example, the control ducts of the air conditioning system illustrated in FIG. 2 provide the bi-level airflow mode, in which the control doors 15 and 17 for the vent and heated air ducts 19A and 19C are opened halfway while the control door 16 for the defroster air duct 19B is fully closed. Therefore, on one hand, air of a relatively low outlet air temperature is blown off into the vehicle past control door 15 and through the vent air outlets 9 of the vent air duct 19A and, on the other hand, air of a relatively high outlet temperature passed through the heater core 8 is blown off into the vehicle past control door 17 and through the heated air outlets 11 of the heated air duct 19C.

Figure 3:
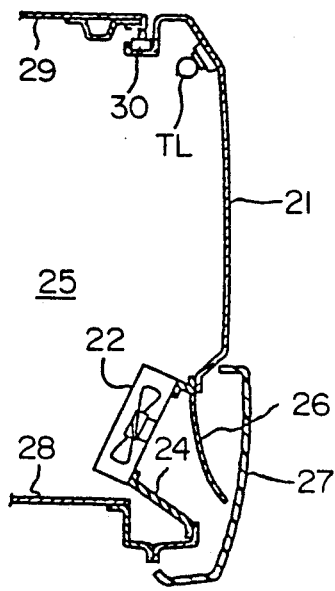
FIG. 3 is a simplified cross-sectional view of a part of the ventilation system of the present invention.

As is shown in FIG. 3, the ventilation fan 22 is disposed at the bottom and to the rear of a trunk volume or room 25, inside the rear fender panel 21. The trunk room 25 is defined by right and left rear fender panels (illustrated in FIG. 3 is the rear fender panel 21 only), a trunk floor panel 28 and a trunk lid 29, and is in communication with the interior of the car body 2 through a duct 5. A lamp switch 30 is provided between the rear fender panel 21 and trunk lid 29 and is adapted to turn on, thereby lighting up a trunk room lamp TL when the trunk lid 29 is closed. An extra duct 24 is connected to the ventilation fan 22 at its upstream end and partially extends out of the trunk room 25. A door 26 is provided to open and close another, downstream end of the extra duct 24. The door 26 and the downstream end of the extra duct 24 are outside of the trunk room 25 and are covered by a rear bumper 27. When the ventilation fan 22 is actuated and the door 26 is open, air is discharged from the inside of the car body 2 to the outside atmosphere through the trunk room 25 and extra duct 24.

Figure 4:
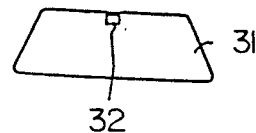
FIGS. 4 and 5 are illustrations showing the location of a dew condensation sensor on a rear window glass.
Figure 5:
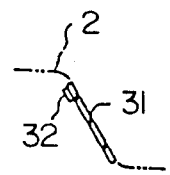
Figure 6:
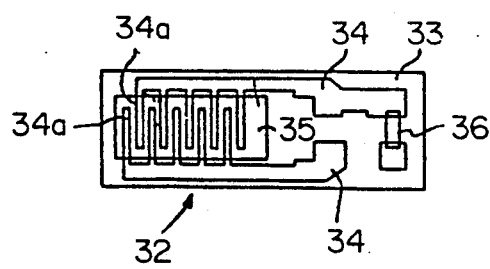
FIG. 6 is a plan view showing the dew condensation sensor of FIGS. 4 and 5.
Figure 7:
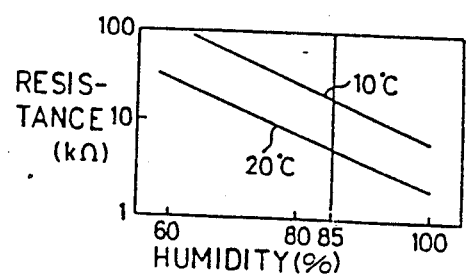
FIG. 7 is a diagram showing the characteristics of the dew condensation sensor.

As is illustrated in FIGS. 4 and 5, the car body 2 is provided with a dew condensation sensor 32 attached to the inner surface of an upper central part of a rear window glass 31. The dew condensation sensor 32 is adapted to judge dew condensation according to the humidity detected inside the car body 2. This dew condensation sensor 32 is preferably a well known, porous ceramic type with an electrical resistance which changes in accordance with humidity, but, alternatively, may be of other types well known in the art. As is shown in detail in FIG. 6, the dew condensation sensor 32 includes an alumina base board 33 with comblike electrodes 34 attached thereto. A thermistor 36 is connected to one of the electrodes 34. The electrodes 34 are arranged along opposite sides of the base board 33 with the teeth 34a of each electrode arranged so as to alternate with teeth 34a of the other electrode. The spaces between adjacent teeth are all equal. All the teeth 34a of the electrodes 34 are covered or coated with a moisture sensitive, variable resistance film 35, such as a tungsten oxide film. The moisture sensitive film 35 changes its resistance according to the amount of moisture or dew thereon. For example, as shown in FIG. 7, the changes in resistance of the moisture sensitive film 35 are plotted at car interior temperatures of 10° C. and 20° C. Accordingly, the humidity is detected by measuring the electrical resistance of the moisture sensitive film 35. The dew condensation sensor 32 provides an appropriate electric output, according to the level of humidity in the car body 2. The dew condensation sensor 32 generates an electric output which is transmitted to a dew condensation judging circuit 102 (which will be described later) to make it decide when a possible "dew condensation point" exists. Such a dew condensation point is present when the circuit receives an electric output representative of a critical relative humidity, for example 85%. This means that the rear window glass 31 will possibly mist over and, therefore, that the rear view through the rear window glass 31 may be obstructed.

Figure 8:
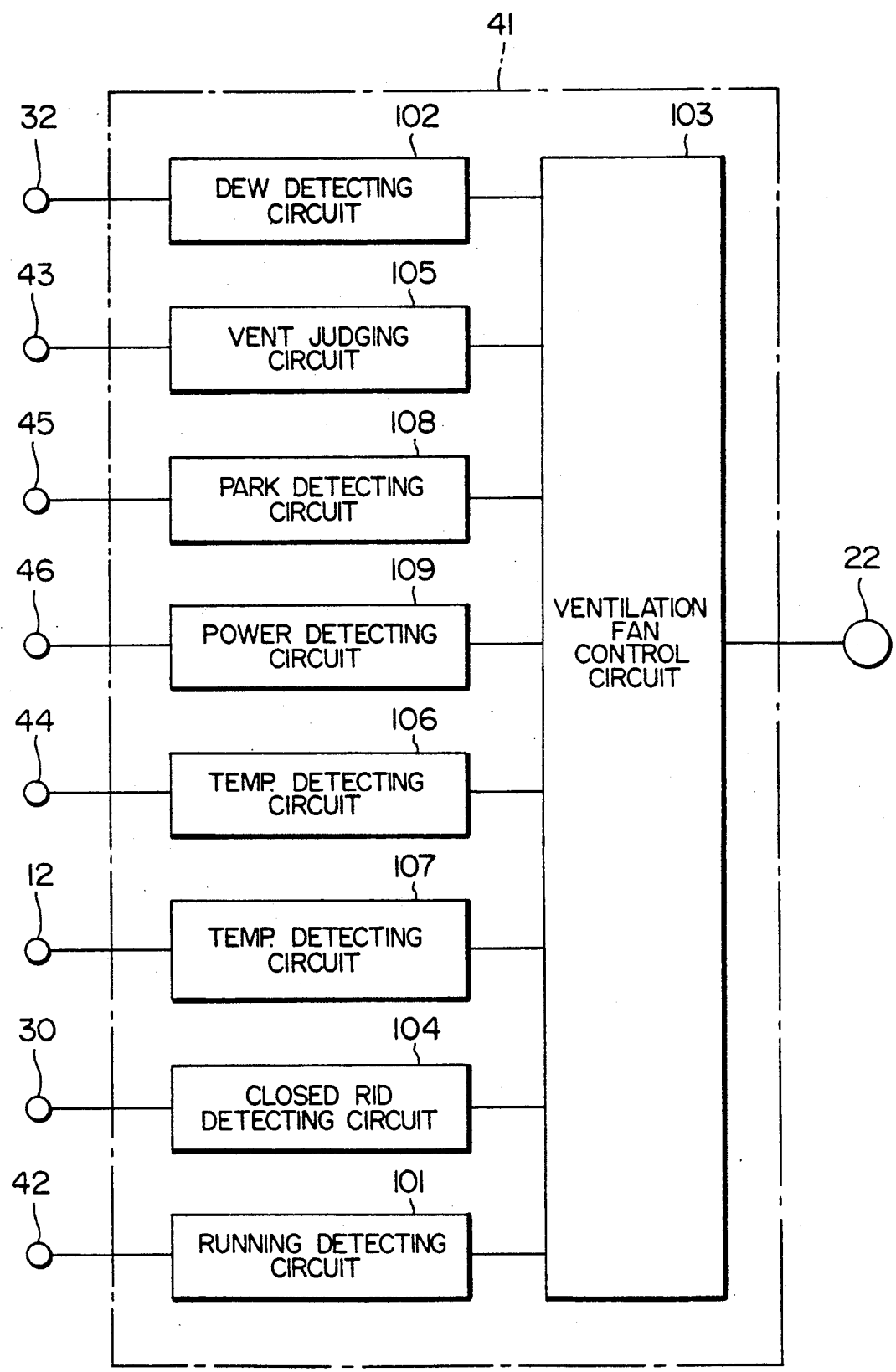
FIG. 8 is a block diagram of a control unit for the air conditioning system.

As is shown in FIG. 8, the ventilation fan 22 is controlled by control circuitry 41, mainly consisting a microcomputer, which receives signals from various sensors. The control circuitry 41 includes various detection circuits and judging circuits. A running detecting circuit 101 receives a signal from a vehicle speed sensor 42 to detect whether the vehicle is running or is stopped. A dew condensation detecting circuit 102 receives a signal from the dew condensation sensor 32 to judge whether the critical relative humidity, e.g., 85%, has been reached. The control circuitry 41 further includes a ventilation fan control circuit 103 which actuates the ventilation fan 22 when the detecting sensors 101 and 102 detect that the critical relative humidity, 85%, is reached while the vehicle is running. A vent judging circuit 105 judges the demand for ventilation based on a signal from a two-way vent switch (2VS) 43. It is to be noted that the two-way vent switch (2VS) 43 is changeable among three positions: an off-position and two vent positions, namely a first on-position or normal vent position and a second on-position or forced vent position. The controller circuitry 41 further includes an atmospheric air temperature detecting means 106 which detects when the temperature of air outside the vehicle reaches a preselected critical temperature of, for instance, approximately 25° C. based on a signal from an atmospheric air temperature sensor 44, an evaporated air temperature detecting circuit 107 which detects when the temperature of evaporated air from the evaporator 7 reaches to a preselected critical temperature of, for instance, approximately 15° C., based on a signal from the evaporated air temperature sensor 12, vehicle parking detecting circuit 108 for detecting when the vehicle is parked, based on a signal provided from an ignition key sensor 45 installed in an ignition key cylinder (not shown) when an ignition key is not inserted in the ignition key cylinder, and a battery power detecting circuit 109 connected to a vehicle battery (not shown) for detecting when sufficient battery power is available. These detecting or judging circuits send the results of their detection or judgment to the ventilation fan control circuit 103. The control circuitry 41 additionally includes a closed trunk lid detecting circuit 104 to detect if the trunk lid 29 has been closed, based on a signal provided from the lamp switch 30 when the switch is turned off. When the closed trunk lid detecting circuit 104 receives a signal indicating that the trunk is open, it disables the ventilation fan control circuitry 103 to prevent actuation of the ventilation fan 22. Operation and fabrication of all the detecting or judging circuits is well known to those skilled in the art and need not be shown and explained in detail.

Figure 9:
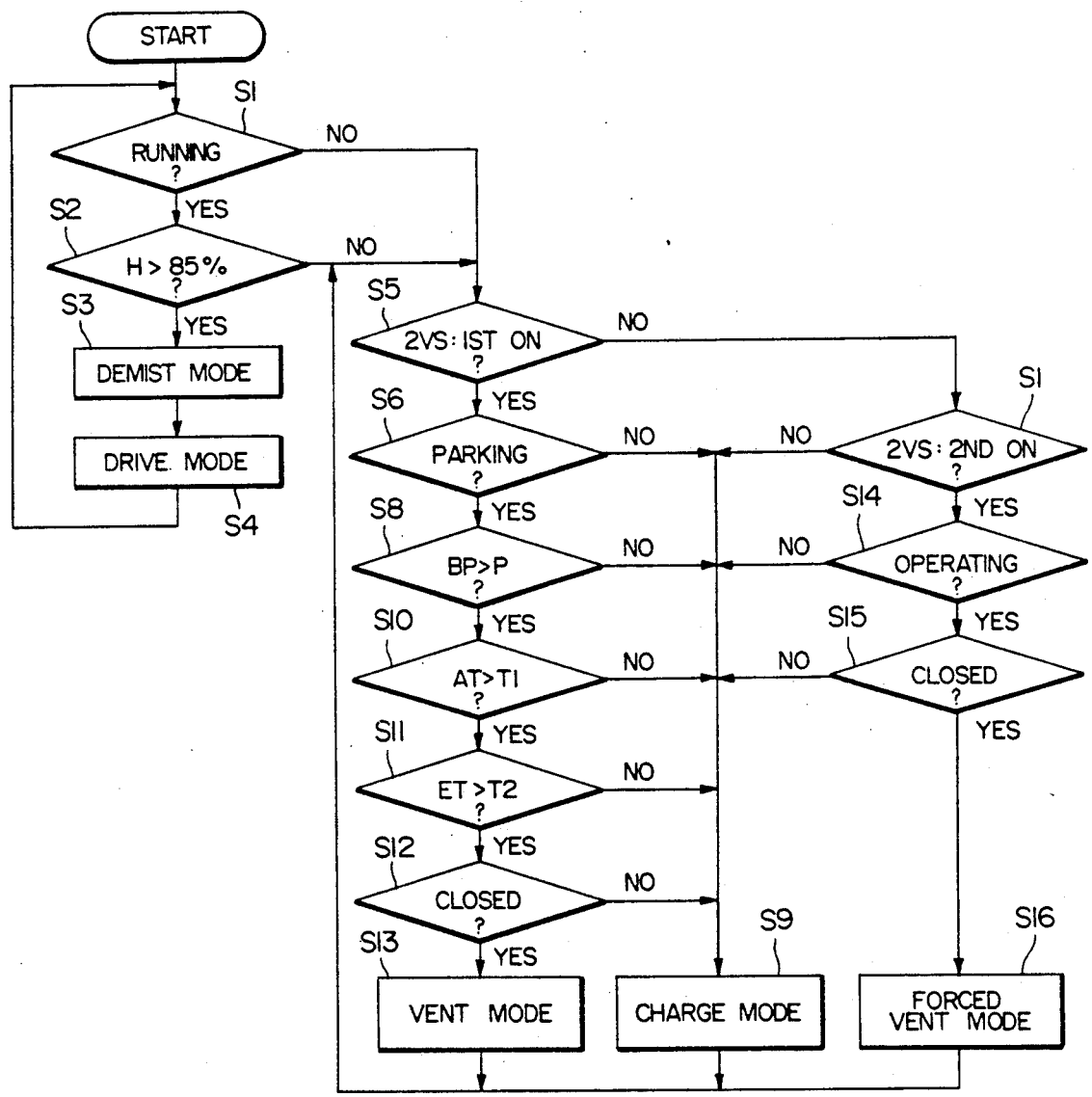
FIG. 9 is a flow chart illustrating an air conditioning device control operating sequence.

The operation of the air conditioning device depicted in FIGS. 1 through 8 is best understood by reviewing FIG. 9, which is a flow chart illustrating a ventilation fan control sequence for the microcomputer of the control circuitry 41. Programming a computer is a skill well understood in the art. The following description is written to enable a programmer having ordinary skill in the art to prepare an appropriate program for the microcomputer. The particular details of any such program would depend upon the architecture of the particular computer selected.

The first step in step S1 is to make a decision whether the vehicle is running, based on the signal from the vehicle speed sensor 42. If in fact the vehicle is running, the answer to the decision in step S1 is yes. Then, in step S2, a decision regarding the humidity (H) inside the vehicle is made, i.e., a decision is made as to whether the critical relative humidity, 85%, has been reached within the vehicle. If the answer to this decision is yes, the rear window glass 31 is expected to mist over with condensed dew, and the air conditioning system is changed to a demist mode, wherein the door 51 is in the ambient air intake position P1, in step S3. Thereafter, the electric motor operated ventilation fan 22 is connected not to the solar cells 3 as the primary power supply, but to the vehicle battery so as to actuate the electric motor operated fan 22, in step S4.

If the answer to the decision in step S1 or in step S2 is no, indicating that the vehicle is stopped or parked, or that condensation of dew will not occur on the rear window glass of the vehicle while the vehicle is running, the vehicle does not need to be in the demist mode. A decision is then made in step S5 to detect the demand for ventilation based on a signal representing the position of two-way vent switch (2VS) 43. If the answer to the decision in step S5 is yes, this indicates that the two-way vent switch (2VS) 43 is in its first on-position, requiring normal ventilation. Then, a decision is made in step S6, as to whether the vehicle is parked, based on a signal indicating that an ignition key is not in the ignition key cylinder from the ignition key sensor 45. If the answer to the decision made in step S6 is yes, the vehicle is in fact parked, and the parked vehicle has an absolute demand for ventilation, i.e., ventilation is absolutely required. However, if the answer to the decision in step S6 is no, this indicates that since the vehicle is not parked and an increase in temperature within the vehicle is unexpected, the vehicle is considered to have almost no demand for ventilation. Then, the air conditioning system is changed to a battery charge mode in step S9 and the vehicle battery 46 is charged by the solar cells 3 as long as sufficient sunlight is available.

After a yes answer to the decision in step S6, power (BP) of the vehicle battery 46 is checked to make sure it is above a predetermined level of power (P) which has been set sufficiently high so that the predetermined level of power (P) can operate the air conditioning system. If the power (BP) of the vehicle battery 46 is poor relative to, i.e., lower than, the predetermined level of power (p), then the vehicle battery 46 is given priority for being supplied with outlet power from the solar cells 3 over the ventilation fan 22. Accordingly, the air conditioning system is changed to its battery charge mode, wherein the vehicle battery 46 is charged by the solar cells 3 as long as sufficient sunlight is available, in step S9. However, if in fact the vehicle battery 46 has power which is sufficiently higher than the predetermined level of power, the ambient air temperature air (AT) and the temperature of evaporated air (ET) are detected in steps S10 and S11, respectively, in order.

If the temperature of ambient air (AT) and the temperature of evaporated air (ET) are higher than predetermined temperatures T1 and T2, respectively, it is considered that the temperature inside the vehicle may gradually become higher and, consequently, that the vehicle should be ventilated. If in fact both the temperatures AT and ET of ambient air and evaporated air are higher that their predetermined temperatures T1 and T2, respectively, then the air conditioning system is changed to its ventilation mode in step S13, as long as it is detected, in step S12, that trunk lid 29 is closed. However, if either one of the temperatures AT of ambient air and ET of evaporated air is not higher that its predetermined temperature T1 or T2, respectively, it is considered that the temperature inside the vehicle will not gradually become higher, or that the temperature inside the vehicle is not too high. Therefore, the air conditioning system is changed to its battery charge mode to charge the vehicle battery 46 by the solar cells 3 as long as sufficient sunlight is available in step S9. The air conditioning system as used in the charge mode has a high efficiency as a result of the aid of cooling power provided by the evaporator 8. If, on the other hand, in step S12 it is determined that the trunk lid 29 is not closed, the air conditioning system is changed to its battery charge mode without actuating the ventilation fan 22. This is because if the ventilation fan 22 is actuated while the trunk rid 29 is open, it could catch dirt or other foreign articles.

If the answer to the decision regarding the two-way vent switch (2VS) 43 in step S5 is no, it is further detected in step S7 whether or not the two-way vent switch (2SV) 43 is in its second-on, or forced vent, position. If the two-way vent switch (2VS) 43 is in its second-on position, the following series of decisions, in order, are made in steps S14 and S15: whether the engine of the vehicle is operating and whether the trunk lid 29 is closed. If all the answers to the consecutive decisions in steps S7, S14 and S15 are yes, the air conditioning system is changed to its forced vent mode, wherein the electric motor operated ventilation fan 22 is connected to the vehicle battery 42 so as to be forcibly actuated, for a preset time period counted by a timing counter, thereby performing forced ventilation, in step S16. However, if any of the answers to the consecutive decisions in steps S7, S14 and S15 is no, the air conditioning system is changed to its battery charge mode wherein the vehicle battery 46 is charged by the solar cells 3, as long as sufficient sunlight is available, in step S9. Changing the air conditioning system to the battery charge mode when the engine is not operated is done in order to prevent the vehicle battery 46 from over-discharging.

It is to be understood that whereas the invention has been fully described in detail with respect to a preferred embodiment thereof, various other embodiments and variations are possible which are within the spirit and scope of the invention, and such embodiments and variations are intended to be covered by the following claims.

What is claimed is:

1. An automobile air conditioning device for an automotive vehicle comprising:

a ventilation system including a ventilation fan for discharging air contained within a passenger chamber of said vehicle out of the vehicle;

window glass provided on said vehicle;

dew condensation detecting means for detecting dew condensation inside said vehicle on said window glass;

vehicle running detecting means for detecting whether or not said vehicle is running; and control means for actuating said ventilation system when said dew condensation detecting means detects dew condensation and said vehicle running detecting means detects that said vehicle is running.

2. An automobile air conditioning device as defined in claim 1, wherein said dew condensation detecting means detects whether humidity around said window glass has reached a dew point at which said dew condensation occurs.

3. An automobile air conditioning device as defined in claim 2, wherein said dew condensation detecting means comprises a moisture sensitive member having a resistance which varies according to humidity and temperature.

4. An automobile air conditioning device as defined in claim 2, wherein said dew point is set to 85% of relative humidity.

5. An automobile air control device as defined in claim 3, wherein said moisture sensitive member is disposed on a rear window glass and inside said passenger chamber.

6. An automobile air conditioning device as defined in claim 1, wherein said ventilation system includes ventilation duct means for communicating said passenger chamber with a trunk room of said vehicle and for communicating said trunk room with the atmosphere outside of said vehicle.

7. An automobile air conditioning device as defined in claim 6, and further comprising a ventilation fan disposed in said trunk room to force air contained in said passenger chambers through said duct means.

8. An automobile air conditioning device as defined in claim 7, wherein said ventilation duct means includes an intake duct having one end opening inside said passenger chamber below said rear window glass and another end opening inside said trunk room, and an exhaust duct having one end connected to said ventilation fan and another end opening to the atmosphere outside said vehicle.

9. An automobile air conditioning device as defined in claim 8, wherein said ventilation fan is disposed at a bottom of said trunk room and adjacent to a rear fender of said vehicle.

10. An automobile air conditioning device as defined in claim 9, wherein said ventilation system has a door member disposed between said other end of said exhaust duct and a rear bumper of said vehicle for opening and closing said exhaust duct.

11. An automobile air conditioning device as defined in claim 1, wherein said window is a rear window glass.

* * * * *